(12) United States Patent  (10) Patent No.: US 10,728,152 B2
Lau  (45) Date of Patent: Jul. 28, 2020

(54) DYNAMIC NETWORK RATE CONTROL

(71) Applicant: T-Mobile USA, Inc., Bellevue, WA (US)

(72) Inventor: Kevin Lau, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/018,649

(22) Filed: Feb. 8, 2016

(65) Prior Publication Data

US 2017/0230292 A1    Aug. 10, 2017

(51) Int. Cl.
*H04L 12/801* (2013.01)
*H04W 28/20* (2009.01)
*H04L 12/825* (2013.01)

(52) U.S. Cl.
CPC ............. *H04L 47/12* (2013.01); *H04W 28/20* (2013.01); *H04L 47/25* (2013.01)

(58) Field of Classification Search
CPC ......... H04L 72/12; H04L 72/25; H04L 72/00; H04L 41/5022; H04N 21/00
See application file for complete search history.

(56) References Cited

U.S. PATENT DOCUMENTS 5,794,140 A    8/1998 Sawyer
6,282,206 B1 *   8/2001 Hindus ................... H04L 29/06
                                       348/E7.081
6,865,426 B1 *   3/2005 Schneck .............. H04L 63/105
                                               370/246

(Continued)

FOREIGN PATENT DOCUMENTS

CN    103152775 A    6/2013
CN    103220377 A    7/2013

(Continued)

OTHER PUBLICATIONS

PCT Search Report and Written Opinion dated May 15, 2017 for PCT Application No. PCT/US17/15947, 9 pages.

(Continued)

*Primary Examiner* — Hassan Kizou
*Assistant Examiner* — Deepa Belur
(74) *Attorney, Agent, or Firm* — Lee & Hayes, P.C.

(57) ABSTRACT

Systems, devices, and techniques for providing content via a bandwidth-conserved connection to a client device is described herein. Content can be encoded at reduced rate in response to being presented with a bandwidth-conserved connection. When the encoded content is received at a network provider, the network provider can determine a transmission pattern to transmit the encoded content to the client device. The transmission pattern can include transmission periods where the encoded content is transmitted at a maximum transmission rate, followed by periods where no encoded content is transmitted. Thus, although an instantaneous transmission rate approaches a maximum transmission rate of a network, the average transmission bandwidth provided to the client device can be limited, thereby reducing congestion in the network. Further, a radio element of the client device can enter a low power state when no encoded content is to be transmitted, thereby reducing power consumption at the client device.

20 Claims, 8 Drawing Sheets

(56) References Cited

U.S. PATENT DOCUMENTS

| | | | |
|---|---|---|---|
| 7,840,667 B2 | 11/2010 | Weller et al. | |
| 8,174,970 B2 * | 5/2012 | Adamczyk | H04L 63/102 370/230 |
| 8,838,589 B1 | 9/2014 | Tam | |
| 9,648,173 B2 | 5/2017 | Cheuk et al. | |
| 9,762,635 B2 | 9/2017 | Sebastian et al. | |
| 9,769,643 B2 | 9/2017 | Baron et al. | |
| 9,860,136 B2 | 1/2018 | Ritter et al. | |
| 10,148,482 B2 | 12/2018 | Zait et al. | |
| 2002/0147766 A1 | 10/2002 | Vanska et al. | |
| 2002/0190725 A1* | 12/2002 | Craven | G01R 29/10 324/627 |
| 2003/0128674 A1* | 7/2003 | Kong | H04B 7/264 370/320 |
| 2004/0114605 A1* | 6/2004 | Karaoguz | H04H 60/80 370/395.21 |
| 2004/0119814 A1* | 6/2004 | Clisham | H04N 7/141 348/14.08 |
| 2004/0213259 A1* | 10/2004 | Porter | H04L 12/5602 370/395.2 |
| 2004/0242203 A1 | 12/2004 | Lipsanen et al. | |
| 2006/0036949 A1* | 2/2006 | Moore | G06F 3/0482 715/730 |
| 2006/0206617 A1 | 9/2006 | Rey et al. | |
| 2007/0091843 A1 | 4/2007 | Patel et al. | |
| 2007/0133412 A1 | 6/2007 | Nutter et al. | |
| 2007/0133603 A1* | 6/2007 | Weaver | H04L 43/0882 370/468 |
| 2007/0136772 A1* | 6/2007 | Weaver | H04N 7/17318 725/95 |
| 2007/0189300 A1 | 8/2007 | Bellora et al. | |
| 2007/0258465 A1 | 11/2007 | Ma et al. | |
| 2008/0040226 A1 | 2/2008 | Roker | |
| 2008/0070550 A1 | 3/2008 | Hose | |
| 2008/0091824 A1 | 4/2008 | Patel et al. | |
| 2008/0195664 A1 | 8/2008 | Maharajh et al. | |
| 2008/0279112 A1 | 11/2008 | Schryer et al. | |
| 2009/0068991 A1 | 3/2009 | Aaltonen et al. | |
| 2009/0282162 A1* | 11/2009 | Mehrotra | H04L 65/607 709/233 |
| 2010/0058401 A1 | 3/2010 | Beyabani | |
| 2010/0066808 A1* | 3/2010 | Tucker | H04L 12/1827 348/14.09 |
| 2010/0085942 A1* | 4/2010 | Oota | H04L 47/10 370/332 |
| 2010/0159924 A1 | 6/2010 | Lagerman et al. | |
| 2010/0161387 A1* | 6/2010 | Harrang | H04L 1/0002 709/238 |
| 2010/0162297 A1 | 6/2010 | Lewis et al. | |
| 2010/0179987 A1 | 7/2010 | Sebastian et al. | |
| 2010/0254368 A1* | 10/2010 | Yamaura | H04L 63/0869 370/345 |
| 2010/0312623 A1 | 12/2010 | Almodovar Herraiz et al. | |
| 2011/0167170 A1* | 7/2011 | Kowali | H04W 28/06 709/232 |
| 2011/0231551 A1 | 9/2011 | Hassan et al. | |
| 2012/0054809 A1* | 3/2012 | Chowdhury | H04N 21/2223 725/93 |
| 2012/0092435 A1* | 4/2012 | Wohlert | H04N 7/147 348/14.02 |
| 2012/0209753 A1 | 8/2012 | Hodges | |
| 2012/0311068 A1* | 12/2012 | Gladwin | H04L 65/602 709/214 |
| 2013/0031279 A1 | 1/2013 | Venugopal et al. | |
| 2013/0083761 A1* | 4/2013 | Pandey | H04W 72/04 370/329 |
| 2013/0097674 A1 | 4/2013 | Jindal et al. | |
| 2013/0100228 A1 | 4/2013 | Tapia et al. | |
| 2013/0223509 A1* | 8/2013 | Tweedale | H04N 21/23418 375/240.01 |
| 2013/0231081 A1 | 9/2013 | Mo et al. | |
| 2013/0254345 A1* | 9/2013 | Kook | H04N 21/23805 709/219 |
| 2013/0318252 A1 | 11/2013 | Bulava | |
| 2014/0003450 A1 | 1/2014 | Bentley et al. | |
| 2014/0146822 A1 | 5/2014 | Janardhanan et al. | |
| 2014/0177497 A1 | 6/2014 | Backholm et al. | |
| 2014/0181850 A1 | 6/2014 | Weaver et al. | |
| 2014/0204740 A1* | 7/2014 | Tokutsu | H04L 47/2441 370/230 |
| 2014/0269677 A1 | 9/2014 | Fighel et al. | |
| 2015/0003264 A1 | 1/2015 | Ma | |
| 2015/0032883 A1* | 1/2015 | Chandrashekar | H04L 43/04 709/224 |
| 2015/0088710 A1 | 3/2015 | Short et al. | |
| 2015/0112830 A1 | 4/2015 | Boulter et al. | |
| 2015/0113554 A1* | 4/2015 | Stern | H04N 21/252 725/32 |
| 2015/0195150 A1 | 7/2015 | Ritter et al. | |
| 2015/0237490 A1 | 8/2015 | Chang et al. | |
| 2015/0281395 A1* | 10/2015 | Pandiarajan | H04L 67/322 709/219 |
| 2015/0341491 A1 | 11/2015 | Lau et al. | |
| 2016/0014630 A1 | 1/2016 | Xu et al. | |
| 2016/0066276 A1* | 3/2016 | Su | H04J 3/1694 370/252 |
| 2016/0103589 A1 | 4/2016 | Dziuk | |
| 2016/0192296 A1 | 6/2016 | Rehan et al. | |
| 2016/0248916 A1 | 8/2016 | Payne, III et al. | |
| 2016/0301582 A1* | 10/2016 | Arndt | H04L 43/04 |
| 2017/0093942 A1 | 3/2017 | Danielsson et al. | |
| 2017/0134459 A1 | 5/2017 | Shetty et al. | |
| 2017/0171775 A1 | 6/2017 | Vagelos | |
| 2017/0214804 A1 | 7/2017 | Payne, III et al. | |
| 2018/0077292 A1 | 3/2018 | Ringberg et al. | |
| 2019/0007376 A1 | 1/2019 | Norrman et al. | |
| 2019/0141103 A1 | 5/2019 | Lau et al. | |

FOREIGN PATENT DOCUMENTS

| | | |
|---|---|---|
| CN | 103222306 A | 7/2013 |
| CN | 103248474 A | 8/2013 |
| EP | 2858303 A1 | 4/2015 |
| WO | WO2012172430 | 12/2012 |
| WO | WO-2018089227 A1 * | 5/2018 |

OTHER PUBLICATIONS

PCT Search Report and Written Opinion dated May 17, 2017 for PCT Application No. PCT/US17/16990, 14 pages.

Low, "How to Turn Off T-Mobile's Binge On and Why You'd Want To—How to Turn Off T-Mobile's Binge On", retrieved on May 20, 2016, available at <<http://www.tomsguide.com/us/how-to-turn-off-bingeon,review-3330.html>>, May 17, 2016, 12 pages.

Michaels, "YouTube Finally Joins T-Mobile's Binge On", retrieved on May 20, 2016, available at: <<http://www.tomsguide.com/us/youtube-joins-binge-on,news-22431.html>>, May 17, 2016, 2 pages.

PCT Search Report and Written Opinion dated Feb. 2, 2017 for PCT application No. PCT/US2016/059899, 13 pages.

Terzis et al., "Announcing the Mobile Data Plan API", retrieved on Apr. 28, 2016, available at: <<http://youtube-eng.blogspot.com/2016/04/announcing-mobile-data-plan-api.html>>, Apr. 27, 2016, 4 pages.

YouTube, "Mobile Data Plan API", retrieved on Apr. 28, 2016, available at: <<https://docs.google.com/document/d/1LU3qzT-vpK38P2DKF-hLJIXV3hWo_fDPRBOOWZUIK_4/edit?pref=2&pli=1>>, 20 pages.

Eisenach, "The Economics of Zero Rating", NERA Economic Consulting, Insight in Economics, Mar. 2015, pp. 1-16.

Office Action for U.S. Appl. No. 14/936,495, dated Mar. 5, 2018, Lau, "Data-Plan-Based Quality Setting Suggestions and Use Thereof to Manage Content Provider Services", 4 pages.

Office Action for U.S. Appl. No. 15/214,033, dated Apr. 2, 2018, Shetty, "Preference-Aware Content Streaming I", 15 pages.

Office Action for U.S. Appl. No. 14/936,495, dated Jun. 18, 2018, Lau, "Data-Plan-Based Quality Setting Suggestions and Use Thereof to Manage Content Provider Services", 12 pages.

(56) References Cited

OTHER PUBLICATIONS

Broida, "Force YouTube to Play HD Videos Every Time", retreived on Sep. 9, 2018 at <<https://www.pcworld.com/article/199532/Force_YouTube_to_Play_HD_Videos_Every_Time.html>>, PCWorld, Jun. 22, 2010.
Killoran, "Why does YouTube on Firefox offer so few quality options even if the video can be viewed in higher quality on Chrome or when it is embedded?", retrieved on Sep. 19, 2018 at <<https://support.mozilla.org/en-US/questions/1006250>>, 2014.
Office Action for U.S. Appl. No. 15/214,033, dated Sep. 25, 2018, Shetty et al, "Preference-Aware Content Streaming", 17 pages.
"YouTube—Broadcast Yourself." May 22, 2010. Retrieved Jan. 4, 2019, from <<https://web.archive.org/web/20100522050653/https://www.youtube.com/create_account>>, 1 page.
Partial Supplementary European Search Report dated Mar. 1, 2019 for European Patent Application No. 16864787.3, 12 pages.
Extended European Search Report dated Jun. 7, 2019 for European Patent Application No. 16864787.3, 10 pages.
Extended European Search Report dated Jun. 26, 2019 for European Patent Application No. 17767120.3, 7 pages.
Extended European Search Report dated Jul. 3, 2019 for European Patent Application No. 17750581.5, a counter part of U.S. Appl. No. 15/018,649, 8 pages.
Office Action for U.S. Appl. No. 16/235,892, dated Sep. 20, 2019, Lau, "Data-Plan-Based Quality Suggestions and Use Thereof to Manage Content Provider Services," 11 pages.
Chinese Office Action dated Mar. 4, 2020 for Chinese Patent Application No. 201680065278.4, a counterpart of U.S. Pat. No. 10,193,943, 10 pages.
English translation of and Chinese Office Action dated Mar. 4, 2020 for Chinese Patent Application No. 201680065278.4, a counterpart of U.S. Pat. No. 10,193,943, 36 pages.
European Office Action dated May 27, 2020 for European Patent Application No. 177671203, a counterpart of U.S. Pat. No. 10,305,952, 5 pages.

* cited by examiner

DYNAMIC NETWORK RATE CONTROL

BACKGROUND

Modern telecommunication systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies.

The infrastructure that makes up the modern telecommunications networks comprises multiple different components or devices that are configured to transmit, receive, relay, and/or route data packets so that data services and/or content can be requested by, and provided to, client devices subscribed to a plan offered by one or more service providers or network communication providers that implement the telecommunications networks.

Telecommunications networks can become congested if many client devices are connected to the network and/or demand for data or services is high. Reducing bandwidth to a client device can reduce congestion, but can introduce problems into the telecommunications networks and/or the operation of the client device.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

The systems, devices, and techniques described herein present opportunities for network providers to manage transmission patterns to control bandwidth and/or content provided to a client device, while improving power management at the client device.

In various embodiments, an available bandwidth provided to a client device can be set by a network provider. For example, in a wireless network, wireless bandwidth is scarce and expensive, and there are often times when the network provider needs to control network speeds across various links for network management, as well as business reasons. In some cases, a maximum available bandwidth can be provided to the client device when a network is lightly used or not congested. However, as more client devices use the network, or as congestion increases, the available bandwidth to an individual client device can be provided at a bandwidth-conserved rate. When a request for content is received at the network provider and/or at the content provider, content at a particular encoding rate is received and transmitted to the client device. Although the available (e.g., the average or effective) bandwidth to an individual client device can be limited, the content can be provided to the client device as bursty transmissions at the maximum transmission rate available between the network provider and the client device. After the bursty transmission is received at the client device, a radio at the client device is disabled, turned off, or transitioned to a low power mode to conserve power. After a period of time has passed, the client device can activate the radio to receive another transmission from the network provider. Thus, although an average transmission rate to a particular client device can be low, the instantaneous transmission rate can approach a maximum transmission rate. Further, because the client device is not operating continuously to transmit and receive data at a low rate, the client device can reduce its power consumption.

In this manner, the systems, devices, and techniques described herein improve a functioning of a computing device by optimizing a transmission between a network provider and a client device. Further, power consumption is reduced at the client device because the client device is not operating continuously to transmit and receive data. Further, the transmission patterns described herein reduce a congestion of a network by maximizing a transmission rate between devices and freeing up resources (e.g., bandwidth, channels, etc.) for additional communications. Further, offering fidelity priority options and bandwidth-conservation options to a user improves a user experience and allows for optimization when content quality or bandwidth conservation is a priority.

The systems, devices, and techniques described herein can be implemented in a number of ways. Example implementations are provided below with reference to the following figures.

Figure 1:
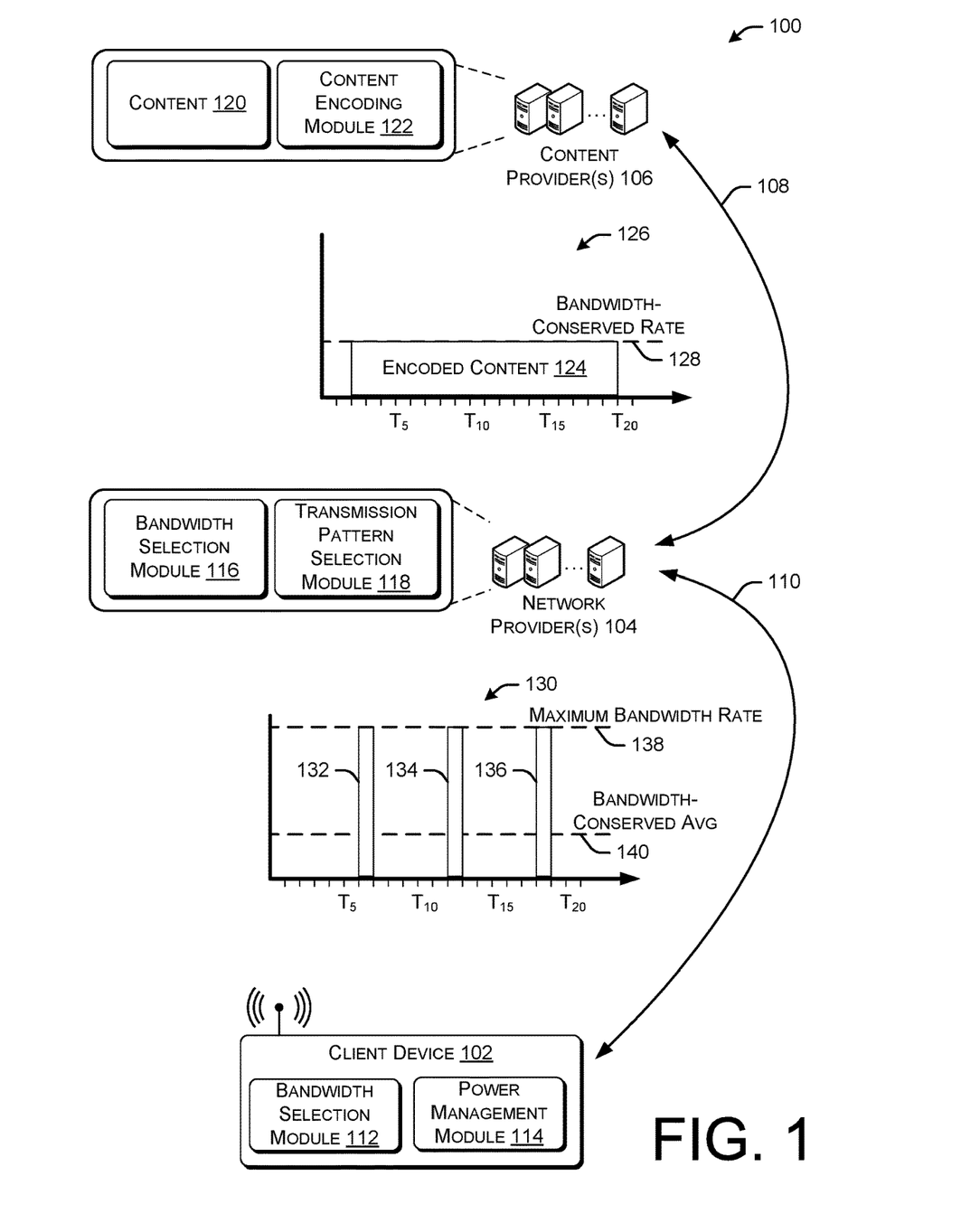
FIG. 1 illustrates an example environment in which content is provided between a content provider, a network provider, and a client device, in accordance with embodiments of the disclosure.

FIG. 1 illustrates an example environment 100 in which content is provided between one or more client device(s) 102, one or more network provider(s) 104, and one or more content provider(s) 106, in accordance with embodiments of the disclosure. In some embodiments, data or content can be transmitted between the devices via a network, which is represented as network paths 108 and 110. As can be understood in the context of this disclosure, the client device 102 can request content from the content provider 106, whereby the content provider 106 can transmit the content via the network path 108 to the network provider 104 (e.g., via a core network as a wired connection), and from the network provider 104 to the client device 102 via the network path 110 (e.g., via a wireless transmission).

The client device 102 can be any sort of device capable of engaging in wireless communication with other, remote devices. Thus, client device 102 can include, but is not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data over the network paths 108 and 110.

In some embodiments, the client device 102 can include a bandwidth selection module 112 and a power management module 114. For example, a user can provide an indication to the bandwidth selection module 112 to indicate a bandwidth preference of the user. For example, the bandwidth selection module 112 can indicate whether the client device 102 is to request fidelity priority content (e.g., at a high encoding rate, for example), which can require a relatively large amount of bandwidth resources to transmit to the client device 102. On the other hand, the user can provide an indication to the bandwidth selection module 112 to indicate whether the client device 102 is to request bandwidth-conserved content (e.g., at a lower encoding rate, for example), which can require relatively less bandwidth when compared to fidelity priority content. In some embodiments, the bandwidth selection module 112 can provide a user interface to the client device 102 so that the user can indicate a resolution of a video, for example, that the user prefers to receive. In some embodiments, the bandwidth selection module 112 can specify an absolute bandwidth amount, a relative bandwidth amount, can be limited for a period of time, can be limited to a particular connection (e.g., cellular or Wi-Fi), etc. In some embodiments, the bandwidth selection module 112 can determine a bandwidth based on a state of a battery, for example, by providing a higher bandwidth when the client device is connected to an external power source or when a battery is above a threshold amount, for example.

Additionally, the client device 102 can include the power management module 114 to monitor, regulate, alert, and/or report to the user of the client device 102 and/or to the network provider 104 or the content provider 106 a state of the power of the client device 102. In some embodiments, the power management module 114 can control the functions of the client device 102 to turn components on and off (or place components in low power and high power modes) to conserve power of the client device 102. For example, the client device 102 can utilize battery power with a finite capacity.

The network provider 104 can include a bandwidth selection module 116 and a transmission pattern selection module 118. In some embodiments, the bandwidth selection module 116 can receive an indication from the bandwidth selection module 112 of the client device 102 to inform the content provider 106 of the preference associated with the client device 102. For example, when the client device 102 requests content, the client device 102 can transmit the content request along with the bandwidth selection (e.g., fidelity priority or bandwidth-conservation) to the network provider 104, and the network provider 104 can transmit the request and the bandwidth selection information to the content provider 106. In some embodiments, the network provider 104 can establish the network path 108 between the network provider 104 and the content provider 106 to reflect the bandwidth selection of the client device 102. That is to say, by establishing the network path 108 as a fidelity priority bandwidth connection or a bandwidth-conserved connection, the network provider 104 can indirectly convey the bandwidth selection of the client device 102 to the content provider 106. In some embodiments, the network provider 104 can expressly transmit the client device 102 bandwidth selection to the content provider 106.

Based upon the direct or indirect indication of the bandwidth selection of the client device 102, the content provider 106 can provide content to the client device 102 at a particular bandwidth to the client device 102 in response to a request for the content.

The content provider 106 includes content 120 and a content encoding module 122. For example, the content 120 can include any data such as video, audio, images, text, programs, etc., that can available on the Internet, for example. In some embodiments, the content encoding module 122 can encode the content 120 at an encoding rate to vary a file size of the content based on an available bandwidth, latency, congestion, delay, noise, etc. of the network paths 108 and 110, for example. In general, when the network path 108 (or 110) is a fidelity priority bandwidth connection, the content encoding module 122 can encode the content 120 to provide a highest resolution, color depth, bit rate, etc. of the content. When the network path 108 (or 110) is a bandwidth-conserved connection, the content encoding module 122 can encode the content 120 to conserve bandwidth when transmitting the encoded content via the network paths 108 or 110. An example of content encoded at a bandwidth-conserved rate is illustrated as encoded content 124 in FIG. 1. As described above, the encoded content 124 can be encoded by the content provider 106 in response to a direct request for bandwidth-conserved content, and/or can be encoded by the content provider 106 is response to sensing the available bandwidth of the network path 108, for example.

Further, the transmission of the encoded content 124 is illustrated in a transmission graph 126 at a bandwidth-conserved rate 128. For example, the transmission graph 126 illustrates transmitting the encoded content 124 via the network path 108 between times $T_2$ and $T_{20}$.

The encoded content 124 is received at the network provider 104 and can be further transmitted to the client device 102. In some embodiments, the network provider 104 can transmit the encoded content 124 to the client device 102 in the same manner as illustrated in the transmission graph 126 (e.g., without applying a transmission pattern). That is to say, the network provider 104 can transmit the encoded content 124 at the bandwidth conserved rate 128 continuously for the same time periods to the client device 102 (e.g, between times $T_2$ and $T_{20}$). However, as can be understood in the context of this disclosure, a transceiver of the client device 102 must be on and active to receive the encoded content 124 in this manner. Thus, the transmission pattern selection module 118 can select a transmission pattern to transmit the encoded content 124 to the client device 102 to conserve power at the client device 102.

As illustrated in the transmission graph 130, the transmission pattern module 118 can segment the encoded content 124 into portions and can transmit bursty transmissions 132, 134, and 136 to the client device 102 at a maximum bandwidth rate 138. Because the transmission pattern illustrated in the transmission graph 130 transmits the bursty transmissions 132, 134, and 136 at the maximum rate between times $T_6$-$T_7$, $T_{12}$-$T_{13}$, and $T_{18}$-$T_{19}$, respectively, for example, the client device 102 only needs to be active and receiving during those respective time periods. In some embodiments, the client device 102 can conserve power during time periods when the network provider 104 is not transmitting data, and can therefore conserve power overall based in part on the transmission pattern. Further, because the illustrated transmission pattern does not use the entire bandwidth for the transmission, the average transmission rate of the bursty transmissions 132, 134, and 136 can be the bandwidth-conserved average 140. Further, because the time periods of transmission are not used in the illustrated transmission graph 130 (e.g., times $T_0$-$T_6$, $T_7$-$T_{12}$, $T_{13}$-$T_{18}$, etc.), the network provider 104 can provide additional content to other client devices during those times, thereby improving a functioning of the network by increasing the number of devices that can be served.

Figure 2:
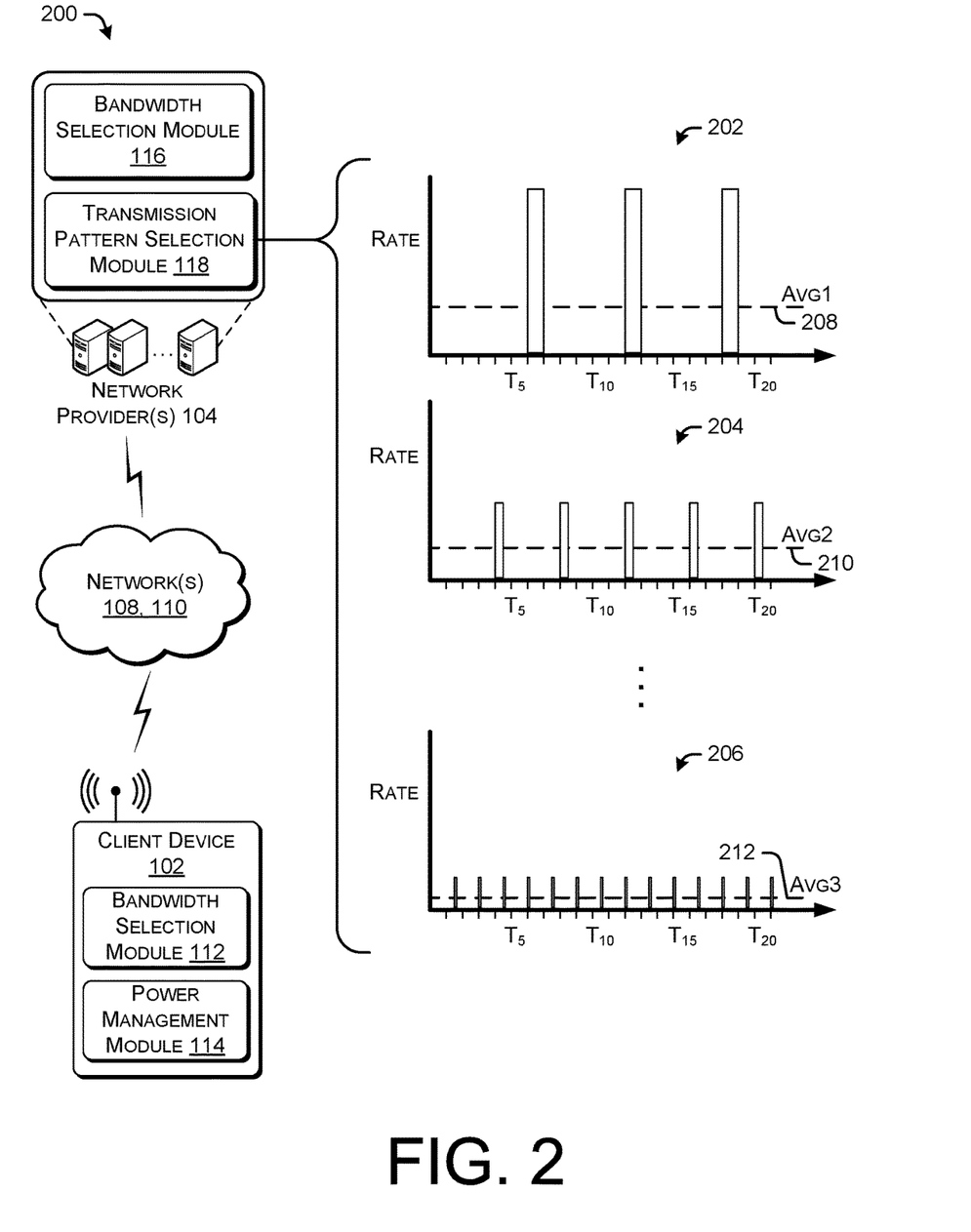
FIG. 2 illustrates an example environment in which a network provider can select various transmission patterns for communicating with a client device, in accordance with embodiments of the disclosure.

FIG. 2 illustrates an example environment 200 in which the network provider 104 can select various transmission patterns 202, 204, or 206 for communicating with a client device 102, in accordance with embodiments of the disclosure.

For example, the transmission pattern selection module 118 can select the transmission patterns 202, 204, and 206 based on a variety of factors, such as the type of content being transmitted (e.g., streaming video, data, voice calls, etc.), a target average bandwidth (e.g., averages 208, 210, and 212), network congestion, a subscription plan associated with the client device 102, indications from the bandwidth selection modules 116 and/or 112, etc. For example, if the bandwidth selection module 112 indicates that a bandwidth-conserved connection is to be used, and the client device 102 is requesting video content, the transmission pattern selection module 118 can select the transmission pattern 202 to transmit the video content to the client device 102.

Although only three transmission patterns 202, 204, and 206 are illustrated in FIG. 2, it is to be understood in the context of this disclosure that any number of transmission patterns can be determined and used. For example, the network provider 104 can dynamically change the transmission pattern based on instantaneous, historical, average, anticipated, etc. conditions present in the network connections, such as the network paths 108 and 110. Further, the transmission pattern selection module 118 can determine any transmission pattern by determining one or more of a transmission burst "width," a transmission burst magnitude (e.g., rate), a transmission burst frequency, a transmission burst duty cycle (e.g., a ratio between a percentage of transmission time compared to non-transmission time for a single period in the transmission pattern), a transmission burst period, a target average, etc.

In some embodiments, the network paths 108 and 110 can comprise a mobile telecommunications network (MTN) configured to implement one or more of the second, third, and fourth generation (2G, 3G, and 4G) cellular-wireless access technologies discussed above. Thus, the MTN can implement GSM, UMTS, and/or LTE/LTE Advanced telecommunications technologies. Further, the network provider 104 and the content provider 106 implementing the GSM, UMTS, LTE, LTE Advanced, and/or HSPA+telecommunications technologies can include, but are not limited to, a combination of: base transceiver stations BTSs (e.g., NodeBs, Enhanced-NodeBs), Radio Network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), or any other data traffic control entity configured to communicate, convert, and/or route data packets between the client device 102, the network provider 104, and/or the content provider 106. While FIGS. 1 and 2 illustrate the network provider 104 and the content provider 106, it is understood in the context of this disclosure that the techniques discussed herein can also be implemented in other networking technologies, such as nodes that are part of a wide area network (WAN), metropolitan area network (MAN), local area network (LAN), neighborhood area network (NAN), personal area network (PAN), or the like.

Figure 3:
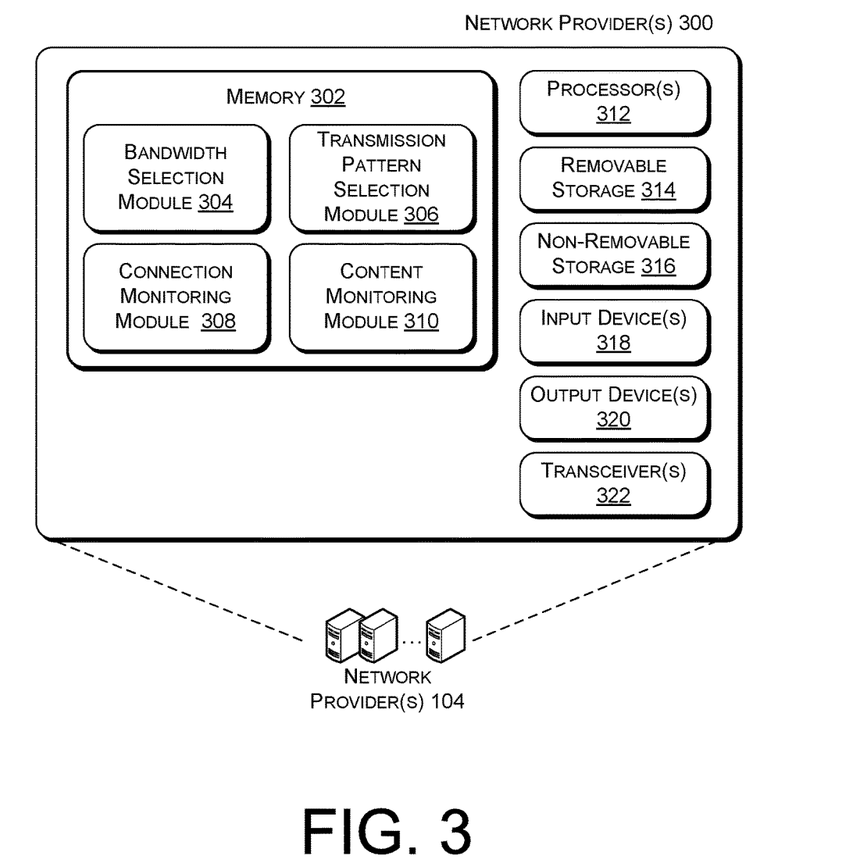
FIG. 3 illustrates an example network provider configured to optimize transmission characteristics to a client device, in accordance with embodiments of the disclosure.

FIG. 3 illustrates an example network provider 300 configured to optimize transmission characteristics to a client device (e.g., client device 102), in accordance with embodiments of the disclosure. In some embodiments, the network provider 300 can correspond to the network provider 104 of FIG. 1. It is to be understood in the context of this disclosure that the network provider 300 can be implemented as a single device or as a plurality of devices with modules and data distributed among them. For example, a bandwidth selection module 304, a transmission pattern selection module 306, a connection monitoring module 308, and/or a content monitoring module 310 can be implemented on different devices 300 of the network provider 104. In some embodiments, the bandwidth selection module 304 can correspond to the bandwidth selection module 116 of FIG. 1. In some embodiments, the transmission pattern selection module 306 can correspond to the transmission pattern selection module 118 of FIG. 1.

As illustrated, the network provider 300 comprises a memory 302 storing the bandwidth selection module 304, the transmission pattern selection module 306, the connection monitoring module 308, and the content monitoring module 310. Also, the network provider 300 includes processor(s) 312, a removable storage 314 and non-removable storage 316, input device(s) 318, output device(s) 320, and transceiver(s) 322.

In various embodiments, memory 302 is volatile (such as RAM), non-volatile (such as ROM, flash memory, etc.) or some combination of the two. The bandwidth selection module 304, the transmission pattern selection module 306, the connection monitoring module 308, and the content monitoring module 310 stored in the memory 302 can comprise methods, threads, processes, applications or any other sort of executable instructions. The bandwidth selection module 304, the transmission pattern selection module 306, the connection monitoring module 308, and the content monitoring module 310 can also include files and databases. Further description of the bandwidth selection module 304 and the transmission pattern selection module 306 is provided above in connection with the bandwidth selection module 116 and the transmission pattern selection module 118 of FIG. 1.

The connection monitoring module 308 can analyze a connection strength, a connection status, components and operations of the devices and networks to form accurate and precise assessments of a Quality of Service (QoS) and a Quality of Experience (QoE). For example, the connection monitoring module 308 can monitor network performance metrics indicating bandwidth and congestion, for example, such as packet loss, packet delay, or packet delay jitter. Further, in some embodiments, the QoS and/or QoE can be measured in accordance with key performance indicators including, but not limited to, Web page loading time, Domain Name System (DNS) lookup time, Transmission Control Protocol (TCP) connect time, TCP round trip time (RTT), Hypertext Transfer Protocol (HTTP) response time, application start times, searching delay, video start delay, fast forward and rewind delay, a number of buffering events, duration per buffering event, rebuffering ratio, a video frame rate, average/minimum/maximum bit rate, traffic burstiness, amount of data bytes transferred, TCP retransmissions and TCP resets, physical retransmissions, physical RTT, etc. The indicators provided above are presented as examples, and thus, the list is not exhaustive. Rather, network providers and/or content providers can contemplate a large number of different indicators which aid in gauging the QoS and QoE associated with the data services provided.

The content monitoring module 310 can monitor network traffic to determine a type of content transmitted from the content provider 106 to the client device 102, and/or between the client device 102 and other client devices. For example, the content monitoring module 310 can inspect packet headers to determine a traffic type, which in part, can be used to determine the transmission pattern to transmit data in the network for a particular communication.

In some embodiments, the processor(s) 312 is a central processing unit (CPU), a graphics processing unit (GPU), or both CPU and GPU, or other processing unit or component known in the art.

The network provider 300 also includes additional data storage devices (removable and/or non-removable) such as, for example, magnetic disks, optical disks, or tape. Such additional storage is illustrated in FIG. 3 by removable storage 314 and non-removable storage 316. Tangible computer-readable media can include volatile and nonvolatile, removable and non-removable media implemented in any method or technology for storage of information, such as computer readable instructions, data structures, program modules, or other data. Memory 302, removable storage 314 and non-removable storage 316 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the network provider 300. Any such tangible computer-readable media can be part of the network provider 300.

The network provider 300 also can include input device(s) 318, such as a keypad, a cursor control, a touch-sensitive display, voice input device, etc., and output device(s) 320 such as a display, speakers, printers, etc. These devices are well known in the art and need not be discussed at length here.

As illustrated in FIG. 3, the network provider 300 also includes one or more wired or wireless transceiver(s) 322. For example, the transceiver(s) 322 can include a network interface card (NIC), a network adapter, a LAN adapter, or a physical, virtual, or logical address to connect to the network(s) 108 and 110, or the content provider 106 or the client device 102, for example. To increase throughput when exchanging wireless data, the transceivers 322 can utilize multiple-input/multiple-output (MIMO) technology. The transceiver(s) 322 can comprise any sort of wireless transceivers capable of engaging in wireless, radio frequency (RF) communication. The transceivers 322 can also include other wireless modems, such as a modem for engaging in Wi-Fi, WiMax, Bluetooth, or infrared communication.

In some embodiments, the network provider 300 can correspond to the content provider 106 of FIG. 1. That is to say, the network provider 300 can include the content 120 and the content encoding module 122 to provide content to the client device 102, for example.

Figure 4:
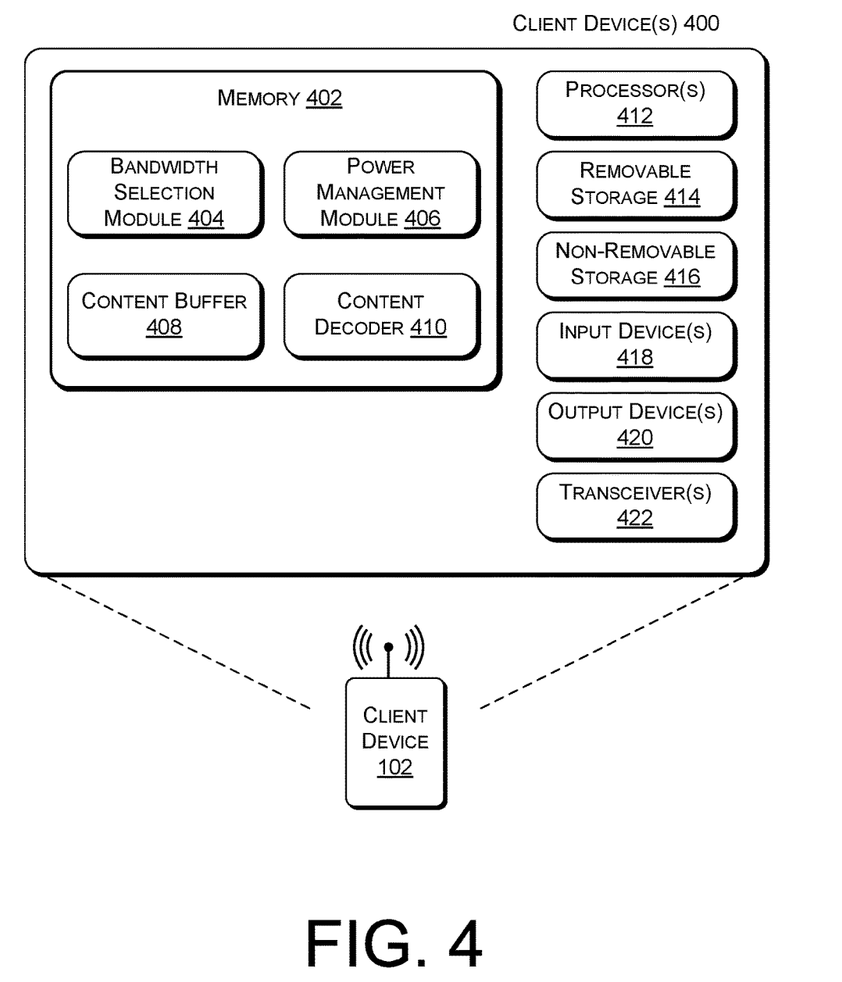
FIG. 4 illustrates an example client device configured to communicate with a network and to implement power saving measures, in accordance with embodiments of the disclosure.

FIG. 4 illustrates an example client device 400 configured to communicate with a network (e.g., the networks 108 and 110) and to implement power saving measures, in accordance with embodiments of the disclosure. In some embodiments, the client device 400 can correspond to the client device 102 of FIG. 1. As illustrated, the client device 400 comprises a memory 402 storing a bandwidth selection module 404, a power management module 406, a content buffer 408, and a content decoder 410. Also, the client device 400 includes processor(s) 412, a removable storage 414 and non-removable storage 416, input device(s) 418, output device(s) 420, and transceiver(s) 422. In some embodiments, the client device 400 can include a microphone, a camera, a GPS, an electronic compass, a heat sensor, biometric sensors, chemical sensors, accelerometer(s), gyroscope(s), pressure sensor(s) and/or photometers.

In various embodiments, memory 402 is volatile (such as RAM), non-volatile (such as ROM, flash memory, etc.) or some combination of the two. The bandwidth selection module 404, the power management module 406, the content buffer 408, and the content decoder 410 stored in the memory 402 can comprise methods, threads, processes, applications or any other sort of executable instructions. The bandwidth selection module 404, the power management module 406, the content buffer 408, and the content decoder 410 can also include files and databases.

In some embodiments, the bandwidth selection module 404 and the power management module 406 can correspond to the bandwidth selection module 112 and the power management module 114 of FIG. 1. In some embodiments, the module operations in the client device 400 can be performed in parallel with the module operations in the network provider 300. In some embodiments, various modules can be used to check the processing determined by the other modules.

In some embodiments, the content buffer 408 can store content at the client device 400 to provide a higher QoE when consuming content (e.g., watching, listening, reading, etc.). For example, in some embodiments, a user can indicate a preference for fidelity priority content, while at the same time, only a bandwidth-conserved connection is available to the client device 400. In such a case, the content provider 106 can provide the fidelity priority content to the client device 102 via a bandwidth-conserved connection (e.g., at a bandwidth-conserved rate). Rather than the content presentation starting and stopping as the content is transmitted at the client device 400, the content buffer 408 can store some or all of the content until enough content is stored such that playback can begin without interruption, with content being transmitted at the bandwidth-conserved rate. As can be understood in the context of this disclosure, this provides an ability for a user to select a preference in viewing fidelity priority content even when a network bandwidth is unavailable or must be conserved.

In some embodiments, the content decoder 410 can decode the encoded content received from the content provider 106. For example, and without limitation, the content decoder 410 can include codecs to decode audio encoded using protocols such as MP3, Vorbis, ACC, or video encoded with a video codec such as H.264, VP8, MP4, FLV, WebM, ASJ, or ISMA, at a variety of resolutions, bit rates, compression ratios, etc., as can be understood in the context of this disclosure.

In some embodiments, the processor(s) 412 is a central processing unit (CPU), a graphics processing unit (GPU), or both CPU and GPU, or other processing unit or component known in the art.

The client device 400 also includes additional data storage devices (removable and/or non-removable) such as, for example, magnetic disks, optical disks, or tape. Such additional storage is illustrated in FIG. 4 by removable storage 414 and non-removable storage 416. Tangible computer-readable media can include volatile and nonvolatile, removable and non-removable media implemented in any method or technology for storage of information, such as computer readable instructions, data structures, program modules, or other data. Memory 402, removable storage 414 and non-removable storage 416 are all examples of computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by the client device 400. Any such tangible computer-readable media can be part of the client device 400.

Client device 400 can include input device(s) 418, such as a keypad, a cursor control, a touch-sensitive display, etc. Also, the client device 400 can include output device(s) 420, such as a display, speakers, etc. These devices are well known in the art and need not be discussed at length here.

As illustrated in FIG. 4, the client device 400 can include one or more wired or wireless transceiver(s) 422. In some wireless embodiments, to increase throughput, the transceiver(s) 422 can utilize multiple-input/multiple-output (MIMO) technology. The transceiver(s) 422 can be any sort of wireless transceivers capable of engaging in wireless, radio frequency (RF) communication. The transceiver(s) 422 can also include other wireless modems, such as a modem for engaging in Wi-Fi, WiMax, Bluetooth, or infrared communication.

FIGS. 5-8 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 5:
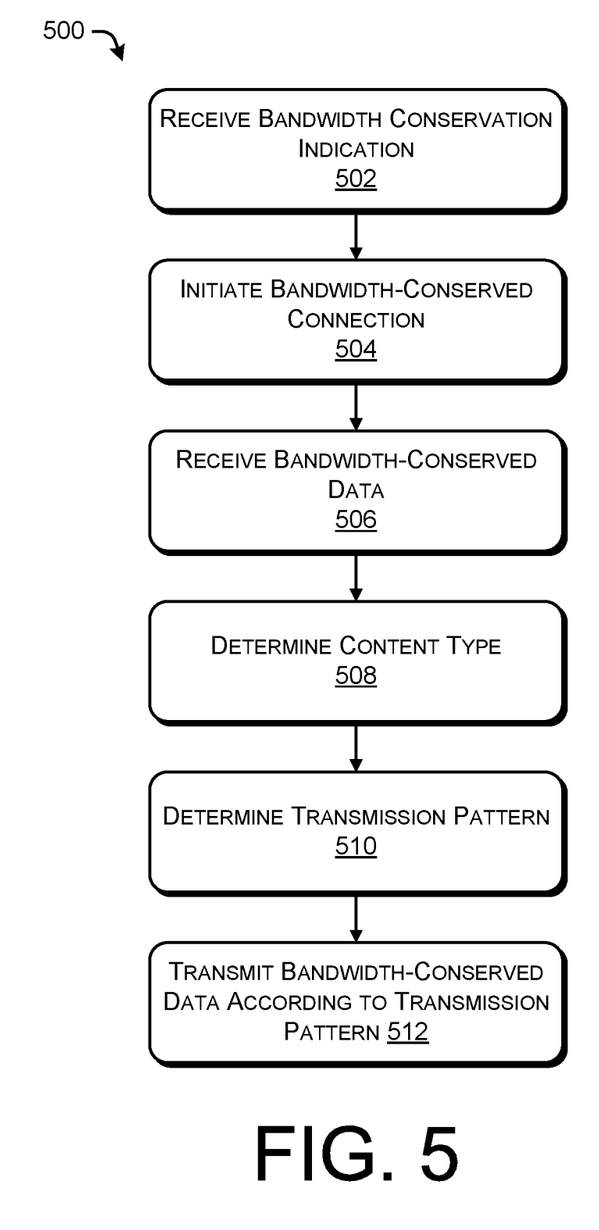
FIG. 5 illustrates an example process for communicating over a bandwidth-conserved connection, in accordance with embodiments of the disclosure.

FIG. 5 illustrates an example process 500 for communicating over a bandwidth-conserved connection, in accordance with embodiments of the disclosure. The example process 500 can be performed by a network provider 104 or 300, for example.

At 502, the operation includes receiving a bandwidth conservation indication. For example, the bandwidth conservation indication can be set by a user in advance at the client device 102. In some embodiments, the bandwidth conservation indication can be received from the client device 102. In some embodiments, the bandwidth conservation indication can be set as a default, whereby an indication must be received at the client device 102 (and transmitted to the network provider 104) to change the default selection. In some embodiments, the bandwidth conservation indication can apply to specific content types (e.g., streaming or real time video or audio), and in some embodiments, the bandwidth conservation indication can apply to specific network addresses and/or domains. For example, the bandwidth conservation indication can be implemented such that content associated with a specific domain (e.g., nytimes.com) is to be transmitted at a bandwidth-conserved rate, while all other content can be transmitted at a higher transmission rate.

At 504, the operation includes initiating a bandwidth-conserved connection. For example, in the context of the environment illustrated in FIG. 1, the network provider 104 can initiate a bandwidth-conserved connection between the network provider 104 and the content provider 106. By way of example and without limitation, if a maximum bandwidth for a particular connection is on the order of 40 Mbps (megabits per second), a bandwidth-conserved connection can be initiated between the content provider 106 and the network provider 104 at a rate of 1.5 Mbps.

At 506, the operation includes receiving bandwidth-conserved data at the network provider 104. In some embodiments, the bandwidth-conserved data can refer to the content that has been encoded by the content provider 106 to be transmitted via the bandwidth-conserved connection. In some embodiments, the bandwidth-conserved data received in the operation 506 can be a continuous stream of data, for example, as illustrated in the transmission graph 126. Further, the bandwidth-conserved data can be provided by the content provider 106 in response to the content provider 106 detecting the bandwidth rate associated with the bandwidth-conserved connection.

At 508, the operation includes determining the content type. In some embodiments, this operation can be performed by the content monitoring module 310 of the network provider 300. For example, the operation 508 can include inspecting a header of the content and determining an encoding type and/or file type to infer or determine the content type.

At 510, the operation includes determining a transmission pattern. In some embodiments, this operation can be performed by the transmission pattern selection module 118 or 306, for example. In some embodiments, the transmission pattern is determined based on a bandwidth that is available to transmit the content from the network provider 104 to the client device 102 (e.g., via the network path 110). For example, the available bandwidth can determine the transmission pattern that provides the average bandwidth equal to (or within a threshold value) of the available bandwidth. In some embodiments, the transmission pattern is determined based on a subscription plan associated with the client device 102 and/or whether the cumulative total of bandwidth used by the client device 102 is above a threshold amount for a particular time period. In some embodiments, the transmission pattern is determined based upon the network QoS, and can be based upon an amount of congestion, delay, etc. of the network. In some embodiments, the transmission pattern can be determined based on a bit rate of the encoded content and/or the total file size of the content to be transmitted to the client device 102. As can be understood in the context of this disclosure, these and other factors can be incorporated into determining the transmission pattern in the operation 510.

At 512, the operation includes transmitting the bandwidth-conserved data according to the transmission pattern determined in the operation 510. For example, the operation 512 can include wirelessly transmitting data to the client device 102 (e.g., via the network path 110) at a maximum burst rate but with a bandwidth-conserved average rate, in accordance with embodiments of the disclosure. In some embodiments, the operation 512 can include transmitting an indication of the transmission pattern to the client device 102 so that the client device 102 can enable and disable the radio link or modem of the client device (or enter low and high power states) to reduce a power consumption at the client device 102.

Figure 6:
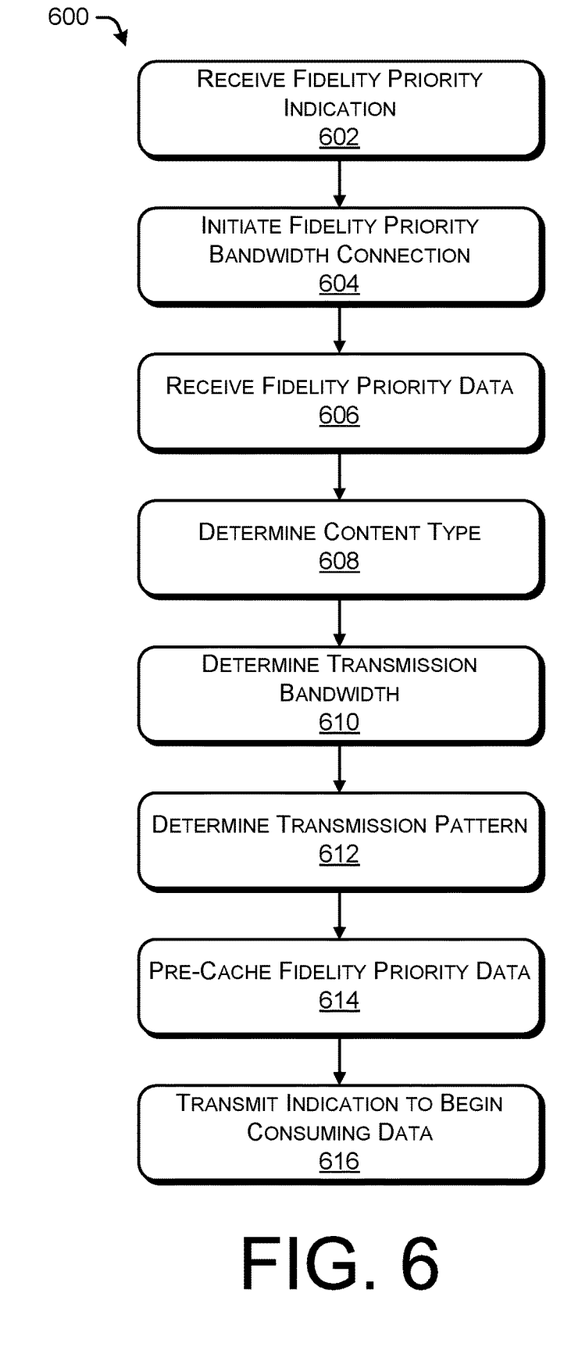
FIG. 6 illustrates an example process for communicating over a fidelity priority bandwidth connection, in accordance with embodiments of the disclosure.

FIG. 6 illustrates an example process 600 for communicating over a fidelity priority bandwidth connection, in accordance with embodiments of the disclosure. The example process 600 can be performed by a network provider 104 or 300, for example.

At 602, the operation includes receiving a fidelity priority indication. For example, the fidelity priority indication can be set by a user in advance at the client device 102. In some embodiments, the fidelity priority indication can be set as a default, whereby an indication must be received at the client device 102 to change the default selection. In some embodiments, the fidelity priority indication can apply to specific content types (e.g., streaming or real time video or audio), and in some embodiments, the fidelity priority indication can apply to specific network addresses and/or domains. For example, the fidelity priority indication can be implemented such that content associated with a specific domain (e.g., cnn.com) is to be transmitted at a fidelity priority rate, while all other content can be transmitted at a lower transmission rate. In some embodiments, the fidelity priority indication is a binary indication associated with the bandwidth conservation indication. That is to say, if the bandwidth conservation indication is turned on or enabled, the fidelity priority indication is turned off or disabled, and vice versa. In some embodiments, the fidelity priority indication can be enabled for some content and/or domains, while the bandwidth conservation indication can be enable for some other content and/or some other domains, for example. As described below, in some embodiments, the bandwidth conservation indication and the fidelity priority indication can be enabled for the same content and/or domains simultaneously to provide fidelity priority content over a bandwidth-conserved connection.

At 604, the operation includes initiating a fidelity priority bandwidth connection. For example, in the context of the environment illustrated in FIG. 1, the network provider 104 can initiate a fidelity priority bandwidth connection (e.g., at a maximum bandwidth rate) between the network provider 104 and the content provider 106. In some embodiments, the fidelity priority bandwidth connection can be sized such that the content provider 106 can transmit a fidelity priority encoded content, for example.

At 606, the operation includes receiving fidelity priority data at the network provider 104. In some embodiments, the fidelity priority data can refer to the content that has been encoded by the content provider 106 to be transmitted via the fidelity priority bandwidth connection. In some embodiments, the fidelity priority data received in the operation 606 can be a continuous stream of data, for example, similar to the encoded content 124 as illustrated in the transmission graph 126, although in this case the encoded content 124 would be encoded at the fidelity priority data rate. Further, the fidelity priority data can be provided by the content provider 106 in response to the content provider 106 detecting the bandwidth rate associated with the fidelity priority bandwidth connection.

At 608, the operation includes determining the content type. In some embodiments, this operation can be performed by the content monitoring module 310 of the network provider 300. For example, the operation 608 can include inspecting a header of the content and determining an encoding type and/or file type to infer or determine the content type.

At 610, the operation includes determining a transmission bandwidth. For example, in the context of the environment illustrated in FIG. 1, the network provider 104 can determine the available bandwidth to transmit the fidelity priority data from the network provider 104 to the client device 102. In some embodiments, the bandwidth selection module 112 and/or 116 can indicate that the client device 102 prefers content at the bandwidth-conserved rate. In some embodiments, the operation includes determining a QoS to determine a congested state of the network, and that the bandwidth to the client device 102 is limited. In some embodiments, the operation 610 can determine that the fidelity priority data rate is higher than the available transmission bandwidth, and that the fidelity priority data will need to be pre-cached at the client device 102 before initiating presentation at the client device 102.

At 612, the operation includes determining a transmission pattern. In some embodiments, this operation can be performed by the transmission pattern selection module 118 or 306, for example. In some embodiments, the transmission pattern is determined based on a bandwidth determined in the operation 610. In some embodiments, the transmission pattern is determined based on a subscription plan associated with the client device 102 and/or whether the cumulative total of bandwidth used by the client device 102 is above a threshold amount for a particular time period. In some embodiments, the transmission pattern is determined based upon the network QoS, and can be based upon an amount of congestion, delay, etc. of the network. In some embodiments, the transmission pattern can be determined based on a bit rate of the encoded content and/or the total file size of the content to be transmitted to the client device 102. As can be understood in the context of this disclosure, these and other factors can be incorporated into determining the transmission pattern in the operation 612.

At 614, the operation includes pre-caching the fidelity priority data at the client device. In some embodiments, this operation includes transmitting the fidelity priority data to the client device 102 with an indication that the client device 102 should not begin presenting the content (e.g., not playing a video or audio). In some embodiments, the fidelity priority data is pre-cached at the client device in the content buffer 408, for example.

At 616, the operation includes transmitting an indication to begin consuming the fidelity priority data. In some embodiments, the operation 616 includes determining an amount of the fidelity priority data pre-cached at the client device, a remaining amount of fidelity priority data to be transmitted, a transmission rate (e.g., according to the transmission pattern determined in the operation 612), and a bit rate or length of content to be presented. For example, the indication to begin consuming the data can be transmitted to the client device 102 when a probably of presenting the data without interruption or delay is above a threshold.

Figure 7:
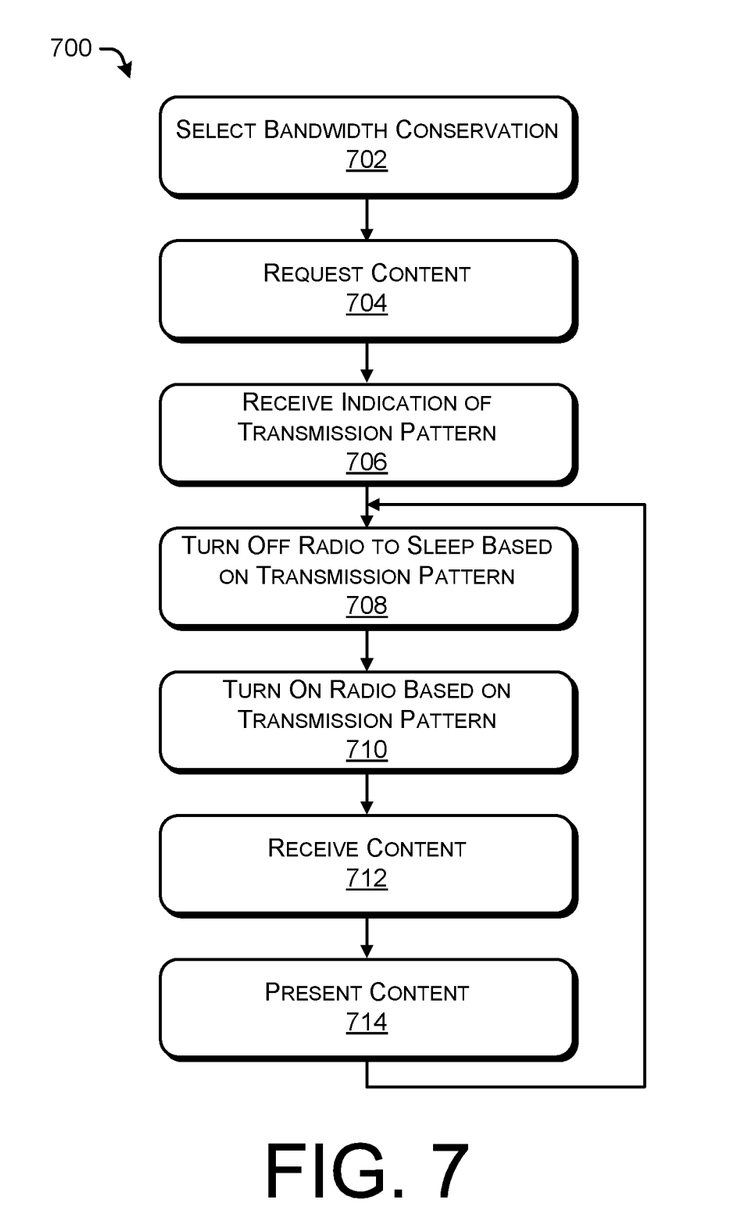
FIG. 7 illustrates an example process for communicating using power saving measures, in accordance with embodiments of the disclosure.

FIG. 7 illustrates an example process 700 for communicating using power saving measures, in accordance with embodiments of the disclosure. In some embodiments, the process 700 can be performed by the client device 102 or 400, for example.

At 702, the operation includes selecting a mode to indicate a bandwidth conservation mode. In some embodiments, the selection can be as simple as turning the mode on or off. However, in some embodiments, the operation can include providing any number of specifics to define particular conditions in which the bandwidth conservation mode can be enabled. For example, the operation 702 can include setting up rules for when to activate the bandwidth conservation mode, such as according to content type, domain type, connection status, amount of content consumed at the client device, time (length) of data, etc.

At 704, the operation includes requesting content. For example, this operation can include operating any number of applications to request content, and/or navigating a browser to a webpage to consume content.

At 706, the operation can include receiving an indication of a transmission pattern, such as one determined by the network provider in the operation 510 or 612. In some embodiments, an express indication is received as a message or signal indicating the transmission pattern, while in some embodiments, the indication can be received by inferring the transmission pattern from receiving data. For example, the operation 706 can include receiving several periods of the transmission pattern and inferring the pattern of the bursty transmission. In some embodiments, the transmission patterns are predetermined and the particular transmission pattern is selected from a limited set of patterns.

At 708, the operation includes turning off a radio element of the client device to sleep based on the transmission pattern. For example, the transceiver 422 of the client device 400 can power down, sleep, or enter a low power mode to conserve power. In some embodiments, the operation includes a timer to wake the device up before the next scheduled or anticipated transmission.

At 710, the operation includes turning on a radio element of the client device 102, or enabling the client device (or the transceiver 422, for example) to receive a transmission.

At 712, the operation includes receiving content. In some embodiments, the operation includes receiving bandwidth-conserved content or fidelity priority content at the client device 102 that has been wirelessly transmitted to the client device 102 from the network provider 104 according to the transmission pattern.

At 714, the operation includes presenting the content. For example, this includes displaying a video and/or presenting audio in accordance with the content received in the operation 712. As indicated in FIG. 7, this process can repeat until the transmission is completed and/or until the content is fully presented at the client device 102.

Figure 8:
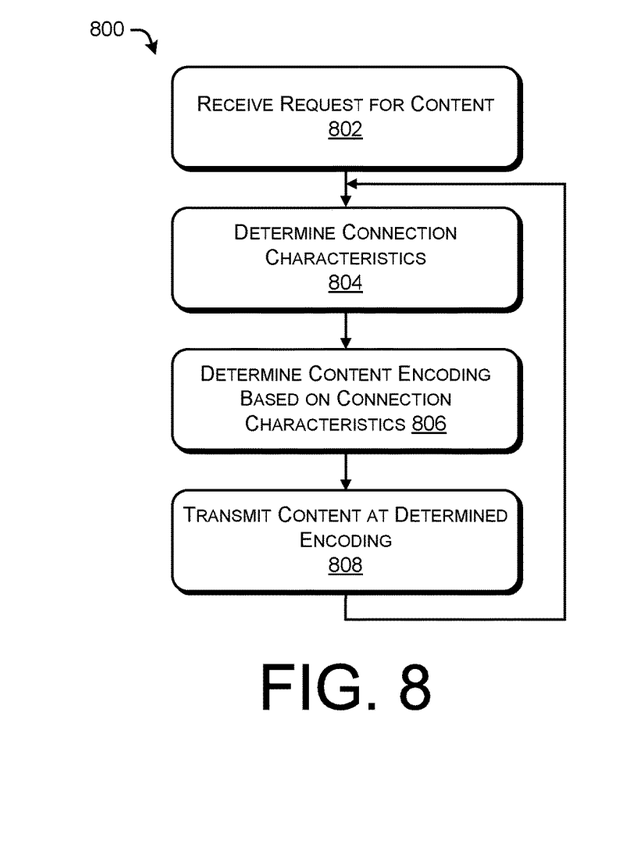
FIG. 8 illustrates an example process for transmitting content based in part on connection characteristics, in accordance with embodiments of the disclosure.

FIG. 8 illustrates an example process 800 for transmitting content based in part on connection characteristics, in accordance with embodiments of the disclosure. In some embodiments, the process 800 can be performed by the content provider 106, while in some embodiments, the process 800 can be performed by the network provider 104 or 300. In some embodiments, the content provider 106 can perform the process 800 in parallel with or in conjunction with the network provider 104 or 300, for example.

At 802, the operation includes receiving a request for content. For example, this request can be a request for any type of content in accordance with embodiment of this disclosure such as video, audio, images, text, or application data.

At 804, the operation includes determining connection characteristics. For example, this operation 804 can include determining or detecting a fidelity priority connection or a bandwidth-conserved connection established between the content provider 106, the network provider 104, and/or the client device 102. In some embodiments, this operation includes receiving an express indication of the bandwidth provided by the network provider 104 in the various network paths 108 or 110, for example. In some embodiments, this operation includes determining a QoS of the connections in the network paths 108 and/or 110.

At 806, the operation includes determining a content encoding based on the connection characteristics. For example, when a fidelity priority connection is determined (e.g., as the network path 108), the operation 806 can encode the content at a highest encoding rate to transmit high quality content. In another example, when a bandwidth-conserved connection is determined, the operation 806 can encode the content at a bandwidth-conserved rate to reduce an amount of content to be transmitted. As can be understood in the context of this disclosure, any number of encoding rates and/or connection quality levels can be used to provide a number of resolutions, bit rates, encoding types, compression amounts, etc. to match the content encoding to the available bandwidth.

At 808, the operation includes transmitting the content at the determined encoding to the network provider 104. As illustrated in FIG. 1, this operation is shown as the transmission graph 126, for example. As can be understood in the context of this disclosure, these operations can be performed continuously during transmission such that the connection status and encoding rate is changed dynamically based on the network status and preferences received from the network provider 104 and/or the client device 102.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system, comprising:
one or more processors;
a memory; and
one or more modules stored in the memory and executable by the one or more processors to perform operations comprising:
receiving, at a network provider, a request to transmit a content to the client device including a bandwidth conservation indication from a client device, the bandwidth conservation indication indicating a client-device-specified preference for a bandwidth for transmitting content from the network provider to the client device that is less than an available bandwidth to the client device, the client-device-specified preference being based on a client-device-specified resolution of content to be received by the client device from the network provider, the client-device-specified resolution of content being less than a maximum resolution of content available to the client device;
initiating, at the network provider, a bandwidth-conserved connection between a content provider and the network provider, the bandwidth-conserved connection indicative of the client-device-specified resolution of content;
receiving, at the network provider, the content as encoded content via the bandwidth-conserved connection from the content provider;
determining, at the network provider, at least one of an encoding type or a file type of the encoded content by inspecting a header of the encoded content, a transmission pattern for transmitting the encoded content from the network provider to the client device based on the encoding type matching the available bandwidth, and a transmission duty cycle associated with the transmission pattern, wherein an average transmission bandwidth associated with the transmission pattern is less than the available bandwidth; and transmitting, from the network provider to the client device, the encoded content in accordance with the transmission pattern.

2. The system of claim 1, wherein the transmission pattern reduces a power consumption level at the client device during the transmitting, from the network provider to the client device, the encoded content in accordance with the transmission pattern.

3. The system of claim 1, wherein the receiving, at the network provider, the content as the encoded content via the bandwidth-conserved connection includes receiving the encoded content as a continuous content stream.

4. The system of claim 1, wherein the encoded content is associated with an encoding rate, and wherein the encoding rate is based at least in part on the bandwidth-conserved connection between the content provider and the network provider.

5. A system, comprising:
one or more processors;
a memory; and
one or more modules stored in the memory and executable by the one or more processors to perform operations comprising:
receiving a request to transmit a content to a client device including a bandwidth conservation indication indicating a client-device-specified preference for a bandwidth for transmitting content from a network provider to the client device that is less than an available bandwidth to the client device, the client-device-specified preference being based on a client-device-specified resolution of content to be received by the client device from the network provider, the client-device-specified resolution of content being less than a maximum resolution of content available to the client device;
initiating a bandwidth-conserved connection between a content provider and the network provider, the bandwidth-conserved connection indicative of the client-device-specified resolution of content;
receiving, at the network provider, encoded content via the bandwidth-conserved connection from the content provider;
determining, at the network provider:
at least one of an encoding type or a file type of the encoded content by inspecting a header of the encoded content,
a transmission pattern for transmitting the encoded content from the network provider to the client device based on the encoding type matching the available bandwidth,
a transmission duty cycle associated with the transmission pattern, and
an average transmission bandwidth associated with the transmission pattern and that the average transmission bandwidth associated with the transmission pattern is less than or equal to an available bandwidth; and
transmitting, from the network provider to the client device, the encoded content in accordance with the transmission pattern.

6. The system of claim 5, wherein the operations further comprise:
determining a maximum transmission rate associated with the transmission pattern; and
determining a transmission period associated with the transmission pattern.

7. The system of claim 5, wherein the transmission pattern includes a transmission period for transmitting at least a portion of the encoded content at a first transmission rate and a non-transmission period where none of the encoded content is transmitted.

8. The system of claim 5, wherein the operations further comprise controlling a power to a transceiver of the client device in accordance with the transmission pattern.

9. The system of claim 5, wherein receiving the encoded content at the client device in accordance with the transmission pattern reduces a power consumption at the client device.

10. The system of claim 5, wherein the operations further comprise:
receiving a fidelity priority indication indicating a preference for a highest-resolution encoding rate provided by the content provider;
initiating a fidelity priority connection between the content provider and the network provider;
receiving, at the network provider, other encoded content via the fidelity priority connection, the other encoded content encoded at the highest-resolution encoding rate provided by the content provider;
determining another transmission pattern for transmitting the other encoded content from the network provider to the client device; and
transmitting, from the network provider to the client device, the other encoded content in accordance with the another transmission pattern.

11. The system of claim 5, wherein the operations further comprise receiving a request for streaming video content, wherein the encoded content is provided based at least in part on the request for streaming video content.

12. The system of claim 5, wherein the bandwidth conservation indication is set in a user interface at the client device.

13. A client device, comprising:
a transceiver;
one or more processors; and
one or more memories storing one or more modules, the one or more modules executable by the one or more processors to perform operations comprising:
receiving a selection of a resolution of content that is less than a maximum resolution available to the client device;
based on the selection, specifying a preference for a bandwidth for transmitting content from a network provider to the client device that is less than an available bandwidth to the client device, the preference indicating a resolution of content or bit rate of content to be received by the client device;
transmitting a bandwidth conservation indication to the network provider, the bandwidth conservation indication indicating the preference;
transmitting a request for a content to a content provider;
receiving encoded content from the network provider in accordance with a transmission pattern, the transmission pattern based on an encoding type of the encoded content determined by inspecting a header of the encoded content, the encoding type matching the available bandwidth, the available bandwidth determined based on a transmission duty cycle associated with the transmission pattern; and controlling a power to the transceiver in accordance with the transmission pattern.

14. The client device of claim 13, further comprising a display, wherein the bandwidth conservation indication is set in a user interface presented on the display of the client device.

15. The client device of claim 13, wherein the transmission pattern includes a transmission period for receiving at least a portion of the encoded content at a first transmission rate and a non-receiving period where none of the encoded content is received.

16. The client device of claim 13, wherein the operations further comprise:

transmitting a fidelity priority indication indicating a preference for a highest-resolution encoding rate provided by the content provider;

transmitting a request for other content to the content provider;

receiving other encoded content from the network provider via another transmission pattern, the other encoded content including the other content encoded at the highest-resolution encoding rate, and the another transmission pattern based at least in part on the fidelity priority indication; and controlling the power to the transceiver in accordance with the another transmission pattern.

17. The client device of claim 13, wherein the encoded content is received via a wireless connection between the network provider and the client device.

18. The system of claim 1, wherein the client-device-specified preference is indicative of an absolute bandwidth amount, a relative bandwidth amount, a period of time, or a connection.

19. The client device of claim 13, wherein the bandwidth conservation indication applies to a network address or a network domain.

20. The system of claim 1, wherein the bandwidth conservation indication is based at least in part on setting in a user interface at the client device.

* * * * *